United States Patent
Wang et al.

(10) Patent No.: US 12,187,881 B2
(45) Date of Patent: Jan. 7, 2025

(54) RECYCLABLE POLYMER FILMS AND COMPOSITIONS

(71) Applicant: BOREALIS AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Peter Niedersuess, Linz (AT); Christian Goetzloff, Linz (AT)

(73) Assignee: BOREALIS AG, Vienna (AT)

( * ) Notice: Subject to any disclaimer, the term of this patent is extended or adjusted under 35 U.S.C. 154(b) by 210 days.

(21) Appl. No.: 18/013,637

(22) PCT Filed: Jun. 29, 2021

(86) PCT No.: PCT/EP2021/067813
§ 371 (c)(1),
(2) Date: Dec. 29, 2022

(87) PCT Pub. No.: WO2022/002916
PCT Pub. Date: Jan. 6, 2022

(65) Prior Publication Data
US 2023/0242749 A1     Aug. 3, 2023

(30) Foreign Application Priority Data

Jun. 29, 2020  (EP) .................................... 20182857

(51) Int. Cl.
| | |
|---|---|
| *B32B 7/02* | (2019.01) |
| *B32B 27/08* | (2006.01) |
| *B32B 27/32* | (2006.01) |
| *C08J 5/18* | (2006.01) |
| *C08J 11/06* | (2006.01) |
| *C08L 23/06* | (2006.01) |
| *C08L 23/14* | (2006.01) |

(52) U.S. Cl.
CPC .............. *C08L 23/142* (2013.01); *B32B 7/02* (2013.01); *B32B 27/08* (2013.01); *B32B 27/32* (2013.01); *C08J 5/18* (2013.01); *C08J 11/06* (2013.01); *C08L 23/06* (2013.01); *B32B 2250/242* (2013.01); *B32B 2270/00* (2013.01); *B32B 2307/7376* (2023.05); *C08J 2323/14* (2013.01); *C08J 2423/06* (2013.01); *C08J 2423/12* (2013.01); *C08L 2203/16* (2013.01); *C08L 2205/025* (2013.01); *C08L 2205/035* (2013.01); *C08L 2207/066* (2013.01); *C08L 2314/06* (2013.01)

(58) Field of Classification Search
CPC ......... B29C 48/08; B29C 48/10; B29C 48/21; B29C 48/362; B29C 48/40; B29D 7/01; B32B 2250/03; B32B 2250/242; B32B 2270/00; B32B 2272/00; B32B 2307/30; B32B 2307/50; B32B 2307/7376; B32B 27/08; B32B 27/32; B32B 7/02; C08J 11/06; C08J 2323/14; C08J 2423/06; C08J 2423/12; C08J 5/18; C08L 2203/16; C08L 2205/025; C08L 2205/035; C08L 2207/066; C08L 23/06; C08L 23/0815; C08L 23/142; C08L 2314/06
See application file for complete search history.

(56) References Cited

U.S. PATENT DOCUMENTS

| | | | |
|---|---|---|---|
| 7,537,829 B2 | 5/2009 | Pellingra et al. | |
| 7,670,523 B2 | 3/2010 | Poloso et al. | |
| 2020/0198308 A1 | 6/2020 | Saniei et al. | |

FOREIGN PATENT DOCUMENTS

| | | |
|---|---|---|
| EP | 0887379 B1 | 12/2004 |
| EP | 1572785 B1 | 10/2006 |
| EP | 1661935 B1 | 12/2007 |
| EP | 3078490 A1 | 10/2016 |
| EP | 3257895 A1 | 12/2017 |
| WO | 1992012182 A1 | 7/1992 |
| WO | 1994014856 A1 | 7/1994 |
| WO | 1995012622 A1 | 5/1995 |
| WO | 1999024478 A1 | 5/1999 |
| WO | 1999024479 A1 | 5/1999 |
| WO | 2000068315 A1 | 11/2000 |
| WO | 2002002576 A1 | 1/2002 |
| WO | 2004000899 A1 | 12/2003 |
| WO | 2004111095 A1 | 12/2004 |
| WO | 2006097497 A1 | 9/2006 |
| WO | 2007116034 A1 | 10/2007 |
| WO | 2010/117150 A2 | 10/2010 |
| WO | 2011076780 A1 | 6/2011 |
| WO | 2011135004 A2 | 11/2011 |
| WO | 2012001052 A2 | 3/2012 |
| WO | 2012084961 A1 | 6/2012 |
| WO | 2013007650 A1 | 1/2013 |
| WO | 2015158790 A2 | 10/2015 |
| WO | 2018122134 A1 | 7/2018 |
| WO | 2020/002349 A1 | 1/2020 |
| WO | 2020/064483 A1 | 4/2020 |
| WO | 2020/064534 A1 | 4/2020 |

OTHER PUBLICATIONS

Ragaert et al. Mechanical and chemical recycling of solid plastic waste, Waste Management, 2017, 69, 24-58.
International Search Report and Written Opinion mailed in International Application PCT/EP2021/067813.

*Primary Examiner* — Lawrence D Ferguson
(74) *Attorney, Agent, or Firm* — Meunier Carlin & Curfman LLC

(57) ABSTRACT

Provided are multilayer polymer films comprising LLDPE, LDPE and a random propylene-ethylene copolymer which films suitable for packaging applications and are mechanically recyclable, and to recycled polymer compositions formed by mechanically recycling such films. The recycled polymer compositions may be combined with a polypropylene random copolymer and used to form further polymer films suitable for packaging applications applications.

20 Claims, No Drawings

RECYCLABLE POLYMER FILMS AND COMPOSITIONS

This invention relates to multilayer polymer films suitable for packaging applications that are mechanically recyclable, and to recycled polymer compositions formed by mechanically recycling such films. The recycled polymer compositions may be combined with a polypropylene random copolymer and used to form further polymer films suitable for packaging applications.

BACKGROUND

Plastic packaging is widely used in daily life due to a favourable cost/performance ratio. Polyolefins are easy and economical to produce with good properties and are widely used in plastic packaging.

Conflicting properties are often required in the packing industry. For example, high stiffness and toughness as well as excellent sealing behavior and good optical properties are required in parallel for plastic films. Different types of polyolefin, for example polypropylene and polyethylene, are routinely combined in blends and/or used in different layers of multilayer films to achieve desired properties. However, use of more than one polymer type complicates the task of recycling the resulting plastic packaging.

One approach to enabling recycling is a 'single material solution', where only one type of polymer material is used. This simplifies recycling of both post-consumer waste and manufacturing waste but limits the range of properties that are available. There is therefore a need for plastic packaging formed from more than one polymer type which has desirable properties but which is also easy to recycle.

SUMMARY OF THE INVENTION

The present invention provides multilayer polymer films which may be used in packaging applications and which are mechanically recyclable. Polymer compositions formed by mechanically recycling such films may then be used to form further polymer films with suitable properties for use in packaging applications.

In one aspect, the invention therefore provides a mechanically recyclable multilayer film comprising at least three layers A-B-C, in that order, wherein:
  layer A comprises 80 to 99 wt. % of a single site catalysed (SSC) linear low density polyethylene (LLDPE) having a melt flow rate MFR (measured according to ISO 1133 at 190° C. and 2.16 kg load) of 0.5 to 8.0 g/10 min and a density of 890 to 925 kg/m$^3$, and 1 to 20 wt. % of a high-pressure low density polyethylene (LDPE) having a melt flow rate MFR (measured according to ISO 1133 at 190° C. and 2.16 kg load) of 0.05 to 2.0 g/10 min and a density of 910 to 940 kg/m$^3$;
  layer B comprises a random propylene-ethylene copolymer with a total ethylene content of 3.0 to 7.5 wt. % having a melt flow rate MFR (measured according to ISO 1133 at 230° C. and 2.16 kg load) of 0.5 to 5.0 g/10 min and a melting point Tm (measured by DSC according to ISO 11357-3) of 110° C. to 135° C.; and
  layer C comprises 80 to 99 wt. % of a single site catalysed (SSC) linear low density polyethylene (LLDPE) having a melt flow rate MFR (measured according to ISO 1133 at 190° C. and 2.16 kg load) of 0.5 to 8.0 g/10 min and a density of 890 to 925 kg/m$^3$, and 1 to 20 wt. % of a high-pressure low density polyethylene (LDPE) having a melt flow rate MFR (measured according to ISO 1133 at 190° C. and 2.16 kg load) of 0.05 to 2.0 g/10 min and a density of 910 to 940 kg/m$^3$; or
  layer C comprises a polypropylene homopolymer having a melt flow rate MFR (measured according to ISO 1133 at 230° C. and 2.16 kg load) of 0.3 to 30 g/10 min and a melting point Tm (measured by DSC according to ISO 11357-3) of 160° C. to 170° C.;
and wherein layer A and layer C are both thinner than layer B.

In a preferred embodiment, layer C has the same composition as layer A. When layer C has the same composition as layer A, this is equivalent to the multilayer film comprising at least three layers A-B-A, in that order.

In another aspect, the invention provides a polyolefin composition (I) formed by mechanical recycling of the above multilayer film of the invention.

In another aspect, the invention provides a polyolefin composition (II) comprising:
  (i) 50 to 90 wt. % of random propylene-ethylene copolymer with a total ethylene content of 3.0 to 7.5 wt. % having a melt flow rate MFR (measured according to ISO 1133 at 230° C. and 2.16 kg load) of 0.5 to 5.0 g/10 min and a melting point Tm (measured by DSC according to ISO 11357-3) of 110 to 135° C.;
  (ii) 4 to 49.9 wt. % of single site catalysed (SSC) LLDPE having a melt flow rate MFR (measured according to ISO 1133 at 190° C. and 2.16 kg load) of 0.5 to 8.0 g/10 min and a density of 890 to 925 kg/m$^3$;
  (iii) 0.05 to 10 wt. % of high-pressure LDPE having a melt flow rate MFR (measured according to ISO 1133 at 190° C. and 2.16 kg load) of 0.05 to 2.0 g/10 min and a density of 910 to 940 kg/m$^3$; and
  (iv) 0 to 25 wt. % of polypropylene homopolymer having an MFR (measured according to ISO 1133 at 230° C. and 2.16 kg load) of 0.3 to 30 g/10 min and a melting point Tm (measured by DSC according to ISO 11357-3) of 160° C. to 170° C.

Preferably, such a composition (II) is formed by mechanically recycling a multilayer film according to the invention.

In another aspect, the invention provides a polyolefin composition (III) comprising:
  (a) 5 to 50 wt. % of the polyolefin composition (I) or (II) as defined above; and
  (b) 50 to 95 wt. % of a polypropylene random copolymer having a melt flow rate MFR (measured according to ISO 1133 at 230° C. and 2.16 kg load) of 1.0 to 20 g/10 min and a melting point Tm (measured by DSC according to ISO 11357-3) of 135° C. to less than 160° C.

In another aspect, the invention provides films formed using the polyolefin compositions (I), (II) or (III).

DETAILED DESCRIPTION OF THE INVENTION

As used herein, the terms "recycled" and "recyclate" are used to indicate material recovered from at least one of post-consumer waste and industrial waste. Post-consumer waste refers to objects having completed at least a first use cycle (or life cycle), i.e. having already served their first purpose, while industrial waste refers to the manufacturing scrap which does normally not reach a consumer. The term "virgin" denotes newly-produced materials and/or objects prior to first use and not having been recycled.

Multilayer Films

The mechanically recyclable multilayer films of the invention comprise at least three layers A-B-C, in that order.

When layer C has the same composition as layer A, this is equivalent to the multilayer film comprising at least three layers A-B-A, in that order.

The layers A, B and C together preferably have a thickness of 10 to 500 μm, more preferably 20 to 400 μm and still more preferably 25 to 300 μm. Layers A and C are both thinner than layer B.

Each of layers A, B and C may optionally and independently contain conventional additives, for example antioxidants, light (e.g. UV) stabilizers, acid scavengers, processing aids, anti-blocking aids, antistatic agents, alpha-nucleating agents and slip agents. Preferably at least an antioxidant is added.

Such additives are well known in the art. Usually these additives are added in quantities of 100-10,000 ppm (based on the weight of the relevant layer of the film) for each single component. Typically, the total amount of all such additives, taken together, will be from 0.1 up to 3.0 wt. %, based on the overall weight of the layer in question.

Slip agents migrate to the surface and act as lubricants polymer to polymer and polymer against metal rollers, giving reduced coefficient of friction (CoF) as a result. Examples include fatty acid amides, like erucamide (CAS No. 112-84-15 5), oleamide (CAS No. 301-02-0), stearamide (CAS No. 124-26-5) or combinations thereof.

Suitable antioxidants include sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Suitable acid scavengers include calcium stearates, sodium stearates, zinc stearates, magnesium and zinc oxides, synthetic hydrotalcite (e.g. SHT, CAS No. 11097-59-9), lactates and lactylates, as well as calcium and zinc stearates.

Suitable antiblocking agents include natural silica such as diatomaceous earth (such as CAS No. 60676-86-0 (SuperFloss™), CAS No. 60676-86-0 (SuperFloss E™), or CAS No. 60676-86-0 (Celite 499™)), synthetic silica (such as CAS No. 7631-86-9, CAS No. 7631-86-9, CAS No. 7631-86-9, CAS No. 7631-86-9, CAS No. 7631-86-9, CAS No. 7631-86-9, CAS No. 112926-00-8, CAS No. 7631-86-9, or CAS No. 7631-86-9), silicates (such as aluminium silicate (Kaolin) CAS No. 1318-74-7, sodium aluminium silicate CAS No. 1344-00-9, calcined kaolin CAS No. 92704-41-1, aluminium silicate CAS No. 1327-36-2, or calcium silicate CAS No. 1344-95-2), synthetic zeolites (such as sodium calcium aluminosilicate hydrate CAS No. 1344-01-0, CAS No. 1344-01-0, or sodium calcium aluminosilicate, hydrate CAS No. 1344-01-0).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Suitable UV-stabilisers include, for example, bis-(2,2,6,6-tetramethyl-4-piperidyl)-sebacate (CAS No. 52829-07-9, Tinuvin 770); and 2-hydroxy-4-n-octoxy-benzophenone (CAS No. 1843-05-6, Chimassorb 81).

Suitable nucleating agents include sodium benzoate (CAS No. 532-32-1); a mixture of aluminiumhydroxy-bis[2,2'-methylene-bis(4,6-di-t-butylphenyl)phosphate] and lithium myristate (commercially available as Adekastab NA-21 of Adeka Palmarole, France), and 1,3:2,4-bis(3,4-dimethylbenzylidene)sorbitol (CAS No. 135861-56-2, commercially available as Millad 3988 from Milliken, USA).

Suitable pigments include carbon black, $TiO_2$ or the like.

The multilayer film may comprise further layers, for example between layers A and B and/or between layers B and C. These layers may comprise other types of polypropylene homo- or copolymers as well as other types of polyethylene homo- or copolymers. These layers may also include barrier layers consisting of polar polymers like ethylene-vinyl alcohol (EVOH) copolymers or polyvinylidene and tie layers to such barrier layers comprising reactively modified polypropylenes like maleic anhydride grafted polypropylene (PP-g-MAH). Accordingly, the total number of layers may be up to 9, for example 8, 7, 6, 5 or 4 layers. However it is preferred that the multilayer film consists of 5 layers or 3 layers, and more preferably of 3 layers. Thus in one preferred embodiment, the multilayer film consists of the layers A, B and C. In this case, the thickness of the three layers A, B and C together is the thickness of the overall film.

The recyclable multilayer film may be a blown film or a cast film, and is preferably a blown film. When the multilayer film is produced on a blown film line, the cooling of the multilayer film can be effected by water cooling or air cooling, the latter being preferred.

The preparation of multilayer cast or blown film is well known in the art. For example, a multilayer blown film may be obtained by a blown film coextrusion process. In the blown film coextrusion process the melts of the polymer materials for the layers A, B and C and optionally any further layers are extruded through an annular die and blown into a tubular film by forming a bubble which is collapsed between nip rollers after solidification. The blown coextrusion can be preferably effected at a melt temperature in the range 170 to 240° C., and cooled by water or preferably by blowing gas (generally air) at a temperature of 10 to 50° C. to provide a frost line height of 0.5 to 8 times the diameter of the die. The blow-up ratio should generally be in the range of from 1.5 to 4.0, such as from 2.0 to 4.0, preferably 2.5 to 3.5.

Optionally one or both surface(s) of the multilayer film can be corona- or flame-treated by one of the known methods. For corona treatment, the film can be passed between two conductor elements serving as electrodes, with a sufficiently high voltage, usually an alternating voltage (about 10000 V and 10000 Hz), being applied between the electrodes such that spray or corona discharges can occur. Due to the spray or corona discharge, the air above the film surface is ionized and reacts with the molecules of the film surface, causing formation of polar inclusions in the essentially non-polar polymer matrix. The treatment intensities are in the usual range, preferably from 38 to 48 dynes/cm after production.

The multilayer films of the invention have suitable properties for use in packaging applications, including industrial packaging, consumer packaging, bags and sacks, lamination films, barrier films, packaging of food or medical products, agricultural films, hygiene products and non-food product packaging.

The multilayer films of the invention in the form of post-consumer and/or industrial waste can be recycled mechanically to provide a polyolefin composition (I). Such compositions possesses suitable properties for blending with a polypropylene random copolymer to form polyolefin compositions (II) which can be used to produce new films with suitable properties for use in packaging applications. Thus, the components of layer A, B and C are compatible with one another, and with additional polypropylene random copolymers when in a blend and when used to form new films.

The mechanical recycling may be performed using methods known in the art, for example in a continuous melt-mixing device at a temperature range of 170 to 270° C. Auxiliary process steps such as cutting, washing, separation and filtration may be integral parts of any mechanical recycling process. The recyclate may preferably be granulated to form pellets. Suitable mechanical recycling processes are known in the art and described for example in chapter 2 of the review paper by Ragaert et al., Waste Management 69 (2017) 24-58.

Layer A

Layer A comprises 80 to 99 wt. % of a single site catalysed (SSC) LLDPE (linear low density polyethylene) having a melt flow rate MFR (measured according to ISO 1133 at 190° C. and 2.16 kg load) of 0.5 to 8.0 g/10 min and a density of 890 to 925 kg/m$^3$, and 1 to 20 wt. % of a high-pressure LDPE (low density polyethylene) having a melt flow rate MFR (measured according to ISO 1133 at 190° C. and 2.16 kg load) of 0.05 to 2.0 g/10 min and a density of 910-940 kg/m$^3$. The wt. % of the SSC LLDPE and the LDPE in layer A are based on the total weight of the layer A.

Layer A comprises 80 to 99 wt. % of the SSC LLDPE, preferably 85 to 98 wt. %, more preferably 88 to 97 wt. %.

Layer A comprises 1 to 20 wt. % of the LDPE, preferably 2 to 15 wt. %, more preferably 3 to 12 wt. %, of the LDPE.

The SSC LLDPE and the LDPE are preferably the only polymer present in layer A. Together, these polymers preferably form at least 90 wt. %, more preferably at least 95 wt. %, yet more preferably at least 98 wt. %, of the total weight of layer A. Any balance up to 100 wt. % may be made up with conventional additives as discussed above.

Layer A preferably has a thickness of 2 to 50 μm, more preferably 3 to 40 μm and most preferably 4 to 30 μm.

Layer A acts as a sealing layer in the multilayer film. Layer A therefore preferably forms one of the outermost (i.e. surface) layers of the multilayer film. The term "sealing layer" is well understood the field of packaging and indicates that said layer can be used for sealing purposes, i.e. that sealing can take place on the surface of this layer or part of this layer.

Layer A is preferably attached, i.e. joined, directly to layer B of the multilayer film.

Single Site Catalysed (SSC) Linear Low Density Polyethylene (LLDPE) of Layer A

The linear low density polyethylene (LLDPE) used in layer A is a single site catalysed (SSC) polymer, for example a metallocene catalysed polymer. It has been found that recyclates containing SSC LLDPE result in films with superior optical properties compared to films formed from compositions comprising non-SSC (e.g. ZN catalysed) LLDPE.

The SSC LLDPE used in layer A has a density in the range of 890 to 925 kg/m$^3$, preferably in the range of 900 to 925 kg/m$^3$, more preferably in the range of 910 to 0.923 kg/m$^3$, and still more preferably has a density in the range of 915 to 922 kg/m$^3$.

The SSC LLDPE has a melt flow rate MFR$_2$ (190° C., 2.16 kg measured according to ISO 1133) in the range of 0.5 to 8.0 g/10 min, preferably in the range of 0.8 to 4.0 g/10 min, and more preferably in the range of 1.0 to 2.5 g/10 min.

The SSC LLDPE contains at least one comonomer, preferably only one or two comonomer(s), the latter being especially preferred. The comonomer(s) is/are preferably $C_3$ to $C_{10}$ α-olefin comonomer(s). The use of copolymers with just one comonomer or terpolymers, i.e. copolymers of ethylene with two comonomers, is particularly preferred.

The SSC LLDPE preferably contains just one or two type(s) of $C_3$ to $C_{10}$ α-olefin comonomer(s). More preferably, the comonomer(s) is/are selected from the group consisting of 1-butene, 1-hexene, 1-octene and mixtures thereof. In one preferred embodiment, the comonomer employed is 1-octene. In another preferred embodiment, the SSC LLDPE is a terpolymer of ethylene, 1-butene and 1-hexene.

The amount of α-olefin comonomer(s) present in the SSC LLDPE can range from 1.0 to 10.0 mol. %, for example 1.5 to 5.0 mol. %, such as 2.0 to 4.0 mol. %. When the SSC LLDPE is a terpolymer consisting of ethylene, 1-butene and 1-hexene it is preferred that the 1-butene content is in the range 0.1 to 1.0 mol. % and the 1-hexene content is in the range of 2.0 to 3.5 mol. %.

Suitable SSC LLDPEs are known in the art, see for example EP3257895 A1, particularly example IE1. Suitable SSC LLDPEs are also commercially available, for example from Borouge under the tradename Anteo, for example Anteo™ FK1828.

LDPE (Low Density Polyethylene) in Layer A

The term low density polyethylene (LDPE) is used to define a polyethylene polymer that is produced in a high pressure process. Typically the polymerization of ethylene and optional comonomer(s) in the high pressure process is carried out in the presence of one or more initiators. The meaning of the term "LDPE" is well known and documented in the literature. The term LDPE describes and distinguishes a high pressure polyethylene from polyethylenes produced in the presence of an olefin polymerisation catalyst. LDPEs have certain typical features, such as different branching architecture, compared to polyethylenes with the same or similar densities produced in the presence of an olefin polymerisation catalyst.

The LDPE used in layer A has a density in the range of 910-940 kg/m$^3$, preferably in the range of 915 to 935 kg/m$^3$, more preferably in the range of 918 to 930 kg/m$^3$.

The LDPE has a melt flow rate MFR$_2$ (190° C., 2.16 kg measured according to ISO 1133) in the range of 0.05 to 2.0 g/10 min, preferably in the range of 0.10 to 1.8 g/10 min, more preferably in the range of 0.15 to 1.5 g/10 min.

Suitable LDPE polymers are known in the art and are also commercially available, including from Borealis AG. One suitable commercially available LDPE is FT5230 available from Borealis AG.

Layer B

Layer B comprises a random propylene-ethylene copolymer with a total ethylene content of 3.0 to 7.5 wt. % having a melt flow rate MFR (measured according to ISO 1133 at 230° C. and 2.16 kg load) of 0.5 to 5.0 g/10 min and a melting point Tm (measured by DSC (differential scanning calorimetry) according to ISO 11357-3) of 110 to 135° C. Layer B forms a core layer of the multilayer films.

Preferably, the random propylene-ethylene copolymer is obtainable, more preferably obtained, in the presence of a metallocene catalyst.

The random propylene-ethylene copolymer used in layer B has a total ethylene content in the range of 3.0 to 7.5 wt. %, preferably in the range of from 4.0 to 6.5 wt. %, and more preferably in the range of from 4.5 to 6.0 wt. %.

The random propylene-ethylene copolymer used in layer B has a melt flow rate MFR2 (230° C.) measured according to ISO 1133 in the range of from 0.5 to 5.0 g/10 min, preferably in the range of from 0.8 to 4.0 g/10 min and more preferably in the range of from 1.0 to 3.0 g/10 min.

The random propylene-ethylene copolymer used in layer B has a melting temperature Tm measured via DSC according to ISO 11357 in the range of from 110° C. to 135° C., preferably in the range of from 112° C. to 130° C., and more preferably in the range of from 115° C. to 125° C.

The random propylene-ethylene copolymer used in layer B preferably has a xylene cold soluble (XCS) content determined at 25° C. according ISO 16152; 2005 of from 0.1 wt. % to below 12.0 wt. %, preferably in the range of from 1.0 to 10.0 wt. %, for example in the range from 1.5 to 8.5 wt. %.

In order to facilitate processing, especially film processing, it is also desirable that the random propylene-ethylene copolymer used in layer B has a suitable crystallization temperature even in absence of any nucleating agents. Preferably, the random propylene-ethylene copolymer used in layer B has a crystallization temperature Tc as determined by DSC according to ISO 11357 in the range of 70° C. to 100° C., more preferably in the range of 72° C. to 95° C., for example in the range of 75° C. to 90° C.

It is also preferred that the difference between melting temperature Tm and crystallization temperature Tc, (Tm-Tc), is rather low. Said difference (Tm-Tc) will preferably be less than 45° C., more preferably in the range of from 30° C. to 44° C., like in the range of from 32° C. to 43° C.

Preferably the random propylene-ethylene copolymer used in layer B has an amount of hexane hot solubles (C6 solubles, FDA) measured according to FDA 177.1520 in the range of from 0.1 to less than 2.5 wt. %, preferably in the range of from 0.2 to 2.0 wt. %, more preferably in the range of from 0.1 to 1.6 and even more preferably in the range of from 0.3 to 1.8 wt. %.

Preferably, the random propylene-ethylene copolymer used in layer B is bimodal in view of the comonomer content and the $MFR_2$ and comprises or consists of polymer fractions (B-1) and (B-2). Preferably it comprises or consists of 50.0 to 85.0 wt. % of a polymer fraction (B-1) having
  (i) an ethylene content in the range of from 2.0 to less than 5.5 wt. %, and
  (ii) a melt flow rate $MFR_{B-1}$ (measured according to ISO 1133 at 230° C. and 2.16 kg load) in the range of from 0.5 to 5.0 g/10 min;
and
15.0 to 50.0 wt. % of a polymer fraction (B-2) having
  (i) an ethylene content in the range of from 5.5 to 10.0 wt. % and
  (ii) a melt flow rate $MFR_B$-2 (measured according to ISO 1133 at 230° C. and 2.16 kg load) in the range of from 0.1 to 3.0 g/10 min;
wherein the melt flow rate $MFR_B$-2 of polymer fraction (B-2) is lower than the $MFR_{B-1}$ of polymer fraction (B-1).

Preferably, the propylene-ethylene copolymer used in layer B comprises 55.0 to 82.0 wt. % of polymer fraction (B-1) and 18.0 to 45.0 wt. % of polymer fraction (B-2), more preferably, 60.0 to 80.0 wt. % of polymer fraction (B-1) and 20.0 to 40.0 wt. % of polymer fraction (B-2).

Polymer fraction (B-1) preferably has an ethylene content in the range of from 2.5 to 5.2 wt. %, and more preferably in the range of from 3.0 to 5.0 wt. %.

The melt flow rate MFR (230° C./2.16 kg) measured according to ISO 1133 of polymer fraction (B-1) is preferably in the range of from 0.8 to 4.0 g/10 min, more preferably in the range of from 1.0 to 3.0 g/10 min.

Polymer fraction (B-2) preferably has an ethylene content in the range of from 5.5 to 8.5 wt. % and more preferably in the range of from 5.6 to 7.5 wt. %.

The melt flow rate MFR (230° C./2.16 kg) measured according to ISO 1133 of polymer fraction (B-2) is preferably in the range of from 0.2 to 2.5 g/10 min and more preferably in the range of from 0.3 to 2.0 g/10 min, for example 0.3 to 1.8 g/10 min.

The propylene-ethylene copolymer used in layer B is therefore preferably prepared by polymerizing propylene and ethylene by a sequential polymerization process comprising at least two reactors connected in series in the presence of a metallocene catalyst. Thus, the propylene-ethylene copolymer can be prepared in a sequential polymerization process comprising at least two polymerization reactors (R1) and (R2), whereby in the first polymerization reactor (R1) a first polymer fraction (B-1) is produced, which is subsequently transferred into the second polymerization reactor (R2). In the second polymerization reactor (R2), a second polymer fraction (B-2) is then produced in the presence of the first polymer fraction (B-1).

Polymerization processes which are suitable for producing the propylene-ethylene copolymer used in layer B generally comprise at least two polymerization stages and each stage can be carried out in solution, slurry, fluidized bed, bulk or gas phase.

The term "polymerization reactor" indicates where the main polymerization takes place. Thus in the case when the process uses one or two polymerization reactors, this definition does not exclude the option that the overall system comprises for instance a pre-polymerization step in a pre-polymerization reactor.

The term "sequential polymerization process" indicates that the propylene-ethylene copolymer used in layer B is produced in at least two reactors connected in series. Accordingly, such a polymerization system comprises at least a first polymerization reactor (R1) and a second polymerization reactor (R2), and optionally a third polymerization reactor (R3).

The first polymerization reactor (R1) is preferably a slurry reactor and can be any continuous or simple stirred batch tank reactor or loop reactor operating in bulk or slurry. The slurry reactor is preferably a (bulk) loop reactor. Bulk means a polymerization in a reaction medium that comprises at least 80% (w/w) monomer.

The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR) is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the process for producing the propylene-ethylene copolymer used in layer B, the conditions for the first reactor (R1), i.e. the slurry reactor (SR), like a loop reactor (LR), of step (a) may be as follows:
  the temperature is within the range of 40° C. to 110° C., preferably between 60° C. and 100° C., more preferably between 65° C. and 95° C.;
  the pressure is within the range of 20 bar to 80 bar (2 to 8 MPa), preferably 40 bar to 70 bar (4 to 7 MPa); and
  hydrogen can be added for controlling the molar mass in a manner known per se.

Subsequently, the reaction mixture of the first reactor (R1) is transferred to the second reactor (R2), e.g. a gas phase reactor (GPR1), where the conditions are preferably as follows:

the temperature is within the range of 50° C. to 130° C., preferably between 60° C. and 100° C.;
the pressure is within the range of 5 bar to 50 bar (0.5 to 5 MPA), preferably 15 bar to 35 bar (1.5 to 3.5 MPa);
hydrogen can be added for controlling the molar mass in a manner known per se.

Preferably, the propylene-ethylene copolymer used in layer B is produced in the presence of a metallocene catalyst. Thus, the propylene-ethylene copolymer used in layer B may be produced by a process comprising the following steps:

a) polymerizing propylene and ethylene in a first reactor (R1), to obtain polymer fraction (B-1);
b) transferring said polymer fraction (B-1) and unreacted comonomers from the first reactor to a second reactor (R2);
c) feeding propylene and ethylene to said second reactor (R2);
d) polymerizing propylene and ethylene in said second reactor (R2) and in the presence of said polymer fraction (B-1) to obtain polymer fraction (B-2), wherein said polymer fraction (B-1) and said polymer fraction (B-2) form the propylene-ethylene copolymer used in layer B as defined above, whereby the polymerization takes place in the presence of a metallocene catalyst comprising (i) a complex of formula (I):

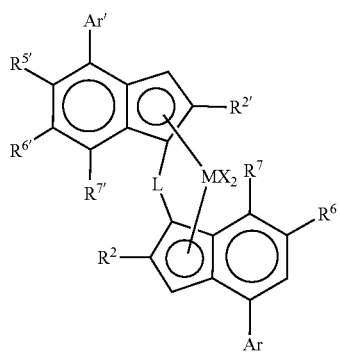

wherein M is zirconium or hafnium;
each X is a sigma ligand;
L is a divalent bridge selected from —$R_2{}^1C$—, —$R_2{}^1C$—$CR_2{}^1$—, —$R_2{}^1Si$—, —$R_2{}^1Si$—$Si$—$R_2{}^1$—, and —$R^{12}Ge$—, wherein each $R^1$ is independently a hydrogen atom, $C_1$-$C_{20}$-hydrocarbyl, tri($C_1$-$C_2$O-alkyl)silyl, C6-C20-aryl, C7-C20-arylalkyl or C7-C20-alkylaryl;
$R^2$ and $R^{2'}$ are each independently a $C_1$-$C_{20}$-hydrocarbyl radical optionally containing one or more heteroatoms from groups 14-16 of the periodic table;
$R^{5'}$ is a $C_{1-20}$-hydrocarbyl group containing one or more heteroatoms from groups 14-16 of the periodic table optionally substituted by one or more halo atoms;
R6 and $R^{6'}$ are each independently hydrogen or a $C_{1-20}$-hydrocarbyl group optionally containing one or more heteroatoms from groups 14-16 of the periodic table; wherein $R^{6'}$ is preferably a tertiary alkyl group;
$R^7$ is hydrogen or $C_{1-20}$-hydrocarbyl group optionally containing one or more heteroatoms from groups 14-16 and $R^{7'}$ is hydrogen;
Ar and Ar' are each independently an aryl or heteroaryl group having up to 20 carbon atoms optionally substituted by one or more groups $R^8$;
each $R^8$ is a $C_{1-20}$-hydrocarbyl group or two $R^8$ groups on adjacent carbon atoms taken together can form a fused 5 or 6 membered non-aromatic ring with the Ar or Ar' group, said ring being itself optionally substituted with one or more groups $R^4$; each $R^4$ is a $C_{1-20}$-hydrocarbyl group; and
(ii) a cocatalyst comprising at least one or two compounds of a group 13 metal of the periodic table, e.g. Al and/or boron compound.

More preferably, a cocatalyst system comprising a boron containing cocatalyst, for example a borate cocatalyst, and an aluminoxane cocatalyst is used.

Even more preferably, the catalyst is supported on a silica support.

Generally, the catalyst system may be prepared as described in WO2018/122134. The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably, the support is a porous material so that the complex may be loaded into the pores of the support, e.g. using a process analogous to those described in WO94/14856 (Mobil), WO95/12622 (Borealis) and WO2006/097497.

The average particle size of the silica support can typically be from 10 to 100 µm. However, it has turned out that special advantages can be obtained if the support has an average particle size from 15 to 80 m, preferably from 18 to 50 m.

The average pore size of the silica support can be in the range 10 to 100 nm and the pore volume from 1 to 3 mL/g.

Examples of suitable support materials include, for instance, ES747JR produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Preferred complexes for use in manufacturing the propylene-ethylene copolymer are those of formula (II') or (II):

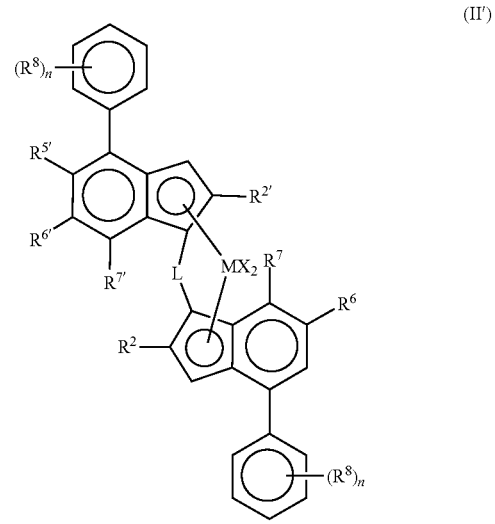

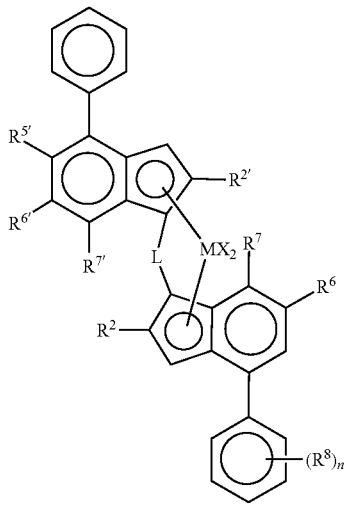

(II)

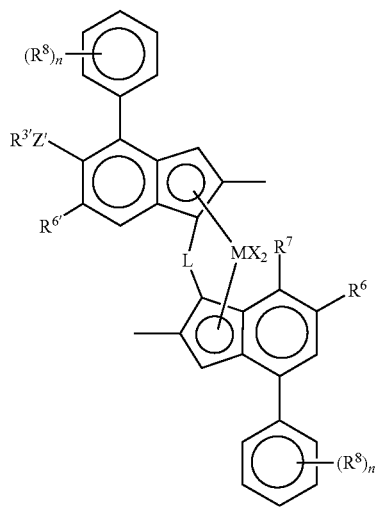

(III')

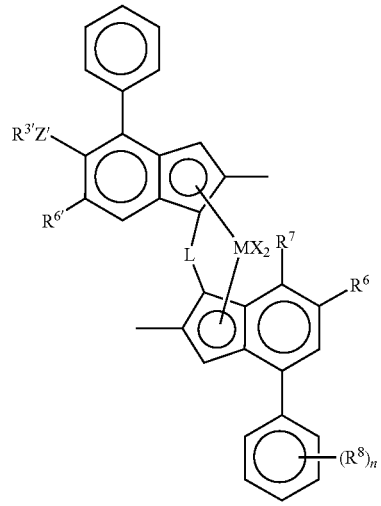

(III)

wherein M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —$R_2^1C$—, —$R_2^1C$—$CR_2^1$—, —$R_2^1Si$—, —$R_2^1Si$—$Si$—$R_2^1$—, and —$R^{12}Ge$—, wherein each $R^1$ is independently a hydrogen atom, $C_{1-20}$-alkyl, $C_{3-10}$-cycloalkyl, tri($C_{1-20}$-alkyl)silyl, $C_{6-20}$-aryl, $C_{7-20}$-arylalkyl or $C_{7-20}$-alkylaryl; each of $R^2$ and $R^{2'}$ is a $C_{1-10}$-alkyl group;

$R^{5'}$ is a $C_{1-10}$alkyl group or a $Z'R^{3'}$ group;

$R^6$ is hydrogen or a $C_{1-10}$-alkyl group;

$R^{6'}$ is a $C_{1-10}$-alkyl group or $C_{6-10}$-aryl group; preferably a tertiary alkyl group;

$R^7$ is hydrogen, a $C_{1-6}$-alkyl group or a $ZR^3$ group and $R^{7'}$ is hydrogen;

Z and Z' are independently O or S;

$R^{3'}$ is a $C_{1-10}$-alkyl group, or a $C_{6-10}$-aryl group optionally substituted by one or more halo groups;

$R^3$ is a $C_{1-10}$-alkyl group;

each n is independently 0 to 4, e.g. 0, 1 or 2; and each $R^8$ is independently a $C_{1-20}$-hydrocarbyl group, e.g. $C_{1-10}$-alkyl group.

Further preferred complexes for use in manufacturing the propylene-ethylene copolymer are those of formula (III') or (III):

wherein

M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —$R_2^1C$— or —$R_2^1Si$—wherein each $R^1$ is independently a hydrogen atom, $C_{1-20}$-alkyl or $C_{3-10}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl;

Z' is O or S;

$R^{3'}$ is a $C_{1-10}$-alkyl group, or $C_{6-10}$-aryl group optionally substituted by one or more halo groups;

each n is independently 0 to 4, e.g. 0, 1 or 2; and each $R^8$ is independently a $C_{1-10}$-alkyl group.

Further preferred complexes for use in manufacturing the propylene-ethylene copolymer are of formula (IV') or (IV):

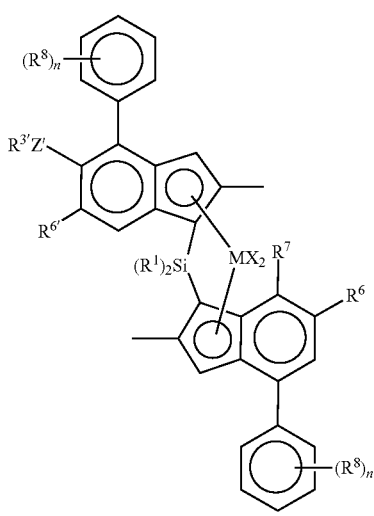

(IV')

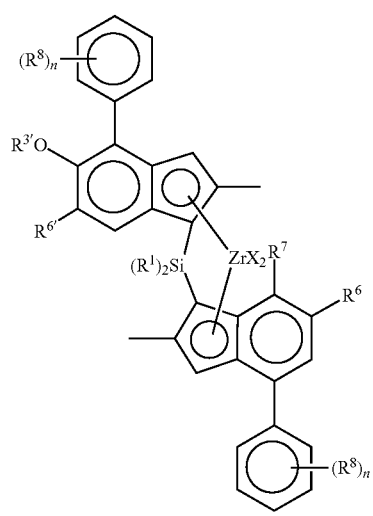

(V¢)

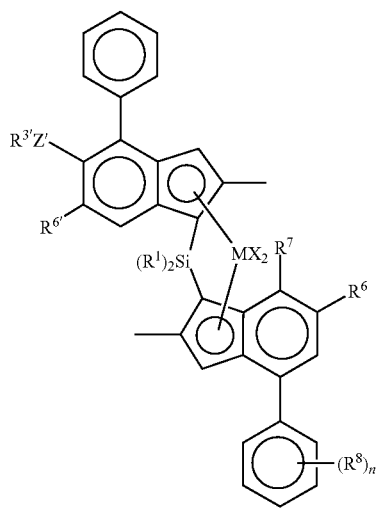

(IV)

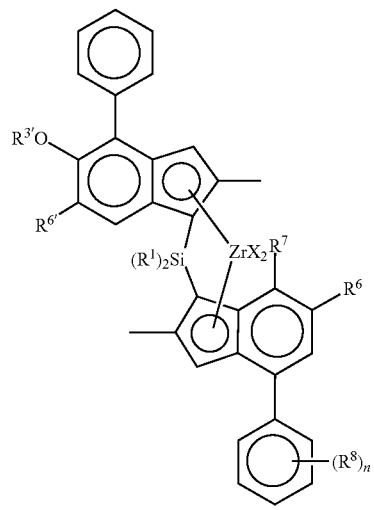

(V)

wherein:

M is zirconium or hafnium;

each X is independently a hydrogen atom, a halogen atom, $C_{1-6}$-alkoxy group, $C_{1-6}$-alkyl, phenyl or benzyl group;

each $R^1$ is independently a hydrogen atom, $C_{1-20}$-alkyl or $C_{3-7}$-cycloalkyl;

$R^6$ is hydrogen or a $C_{1-10}$-alkyl group;

R6' is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl;

Z' is O or S;

$R^{3'}$ is a $C_{1-10}$-alkyl group, or $C_{6-10}$-aryl group optionally substituted by one or more halo groups;

each n is independently 0, 1 to 2; and each $R^8$ is independently a $C_3$-8-alkyl group.

Most preferably, the complex for use in manufacturing the propylene-ethylene copolymer is a complex of formula (V') or (V):

wherein each X is independently a hydrogen atom, a halogen atom, $C_{1-6}$-alkoxy group, $C_{1-6}$-alkyl, phenyl or benzyl group;

each $R^1$ is independently a $C_{1-6}$-alkyl or $C_{3-10}$-cycloalkyl;

each $R^8$ is independently $C_{3-8}$-alkyl;

$R^6$ is hydrogen or a $C_{3-8}$-alkyl group;

R6' is a $C_3$-8-alkyl group or $C_{6-10}$-aryl group, preferably a tertiary $C_{4-8}$-alkyl group;

$R^{3'}$ is a $C_{1-6}$-alkyl group, or $C_{6-10}$-aryl group optionally substituted by one or more halo groups; and each n is independently 0, 1 or 2.

Particularly preferred compounds for use in manufacturing the propylene-ethylene copolymer include:

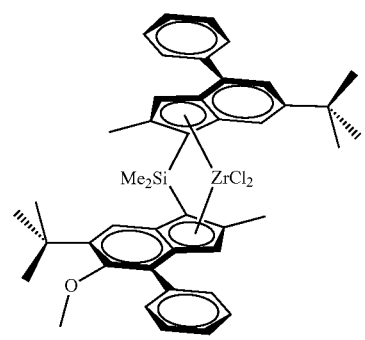
rac-anti-Me₂Si(2-
Me-4-Ph-6-tBu-
Ind)(2-Me-4-Ph-5-
OMe-6-tBu-
Ind)ZrCl₂
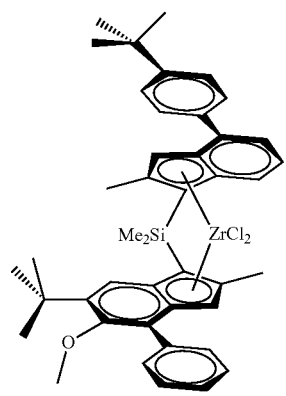
rac-anti-Me₂Si(2-
Me-4-(p-tBuPh)-
Ind)(2-Me-4-Ph-5-
OMe-6-tBu-
Ind)ZrCl₂
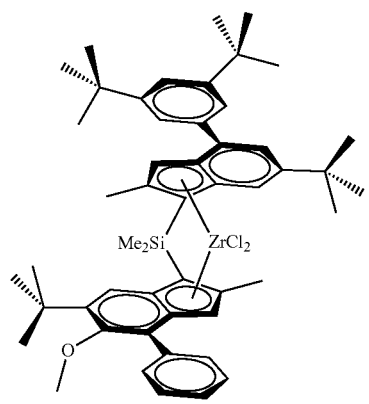
rac-anti-Me₂Si(2-
Me-4-(3,5-di-
tBuPh)-6-tBu-
Ind)(2-Me-4-Ph-5-
OMe-6-tBu-
Ind)ZrCl₂
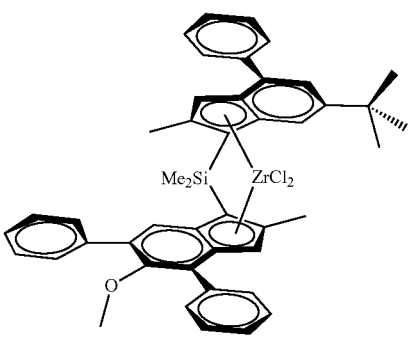
rac-anti-Me₂Si(2-
Me-4-Ph-6-tBu-
Ind)(2-Me-4,6-di-
Ph-5-OMe-
Ind)ZrCl₂
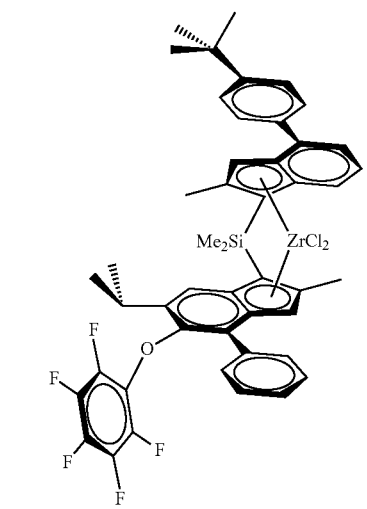
rac-anti-
Me₂Si(2-Me-4-
(p-tBuPh)-
Ind)(2-Me-4-
Ph-5-OC₆F₅)-6-
iPr-Ind)ZrCl₂
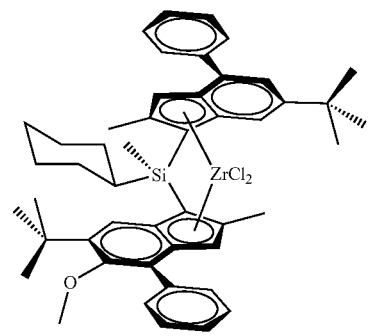
rac-anti-
Me-(CyHex)Si(2-
Me-4-Ph-6-tBu-
Ind)(2-Me-4-Ph-
5-OMe-6-tBu-
Ind)ZrCl₂

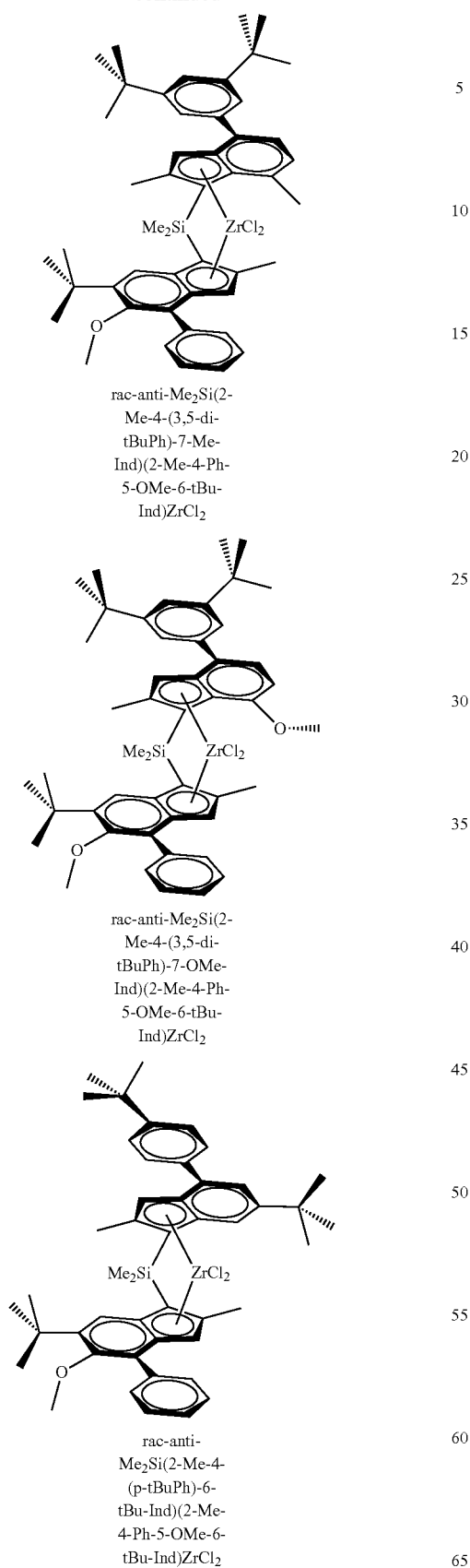
rac-anti-Me₂Si(2-Me-4-(3,5-di-tBuPh)-7-Me-Ind)(2-Me-4-Ph-5-OMe-6-tBu-Ind)ZrCl₂
rac-anti-Me₂Si(2-Me-4-(3,5-di-tBuPh)-7-OMe-Ind)(2-Me-4-Ph-5-OMe-6-tBu-Ind)ZrCl₂
rac-anti-Me₂Si(2-Me-4-(p-tBuPh)-6-tBu-Ind)(2-Me-4-Ph-5-OMe-6-tBu-Ind)ZrCl₂
rac-anti-Me₂Si(2-Me-4-(p-tBuPh)-Ind)(2-Me-4-(4-tBuPh)-5-OMe-6-tBu-Ind)ZrCl₂
rac-anti-Me₂Si(2-Me-4-(p-tBuPh)-Ind)(2-Me-4-(3,5-tBu2Ph)-5-OMe-6-tBu-Ind)ZrCl₂

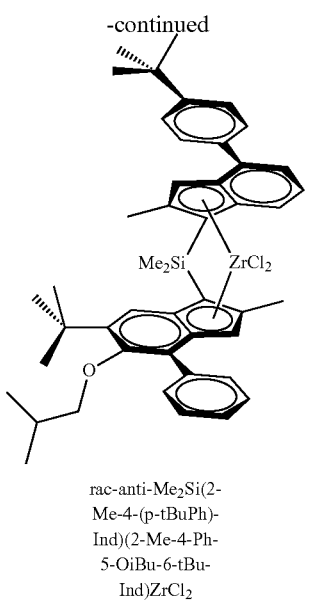

rac-anti-Me$_2$Si(2-
Me-4-(p-tBuPh)-
Ind)(2-Me-4-Ph-
5-OiBu-6-tBu-
Ind)ZrCl$_2$

Most preferably rac-anti-Me$_2$Si(2-Me-4-(p-tBluPh)-Ind) (2-Me-4-Ph-5-OMe-6-tBlu-Jnd)ZrCl$_2$ is used.

The ligands required to form the complexes and catalysts can be synthesised by any suitable process and the skilled organic chemist would be able to devise various synthetic protocols for the manufacture of the necessary ligand materials. For example WO2007/116034 discloses the necessary chemistry. Synthetic protocols can also generally be found in WO2002/02576, WO2011/135004, WO2012/084961, WO2012/001052, WO2011/076780, WO2013/007650, WO2015/158790 and WO2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminium compounds or boron containing cocatalysts or combinations thereof used to activate metallocene catalysts are suitable for use in manufacturing the propylene-ethylene copolymer.

Preferably, a cocatalyst system comprising a boron containing cocatalyst, e.g. a borate cocatalyst and an aluminoxane cocatalyst is used.

The single-site polymerization catalyst system used in manufacturing the propylene-ethylene copolymer can therefore comprise (i) a complex as defined above and an aluminoxane cocatalyst.

The aluminoxane cocatalyst can be one of formula (VI):

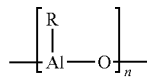

where n is from 6 to 20 and R has the meaning below.

Aluminoxanes are formed on partial hydrolysis of organoaluminium compounds, for example those of the formula AlR$_3$, AlR$_2$Y and Al$_2$R3Y$_3$ where R can be, for example, C$_1$-C$_{10}$-alkyl, preferably C1-C$_5$-alkyl, or C$_3$-C$_{10}$-cycloalkyl, C$_7$-C$_{12}$-arylalkyl or -alkylaryl and/or phenyl or naphthyl, and where Y can be hydrogen, halogen, preferably chlorine or bromine, or C$_1$-C$_{10}$-alkoxy, preferably methoxy or ethoxy. The resulting oxygen-containing aluminoxanes are not in general pure compounds but mixtures of oligomers of the formula (VI).

The preferred aluminoxane is methylaluminoxane (MAO).

Since the aluminoxanes used as cocatalysts are not, owing to their mode of preparation, pure compounds, the molarity of aluminoxane solutions hereinafter is based on their aluminium content.

A boron containing cocatalyst can also be used in the manufacture of the propylene-ethylene copolymer.

Boron containing cocatalysts of interest include those of formula (VII):

$$BY_3 \qquad (VII)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, and aromatic fluorinated groups such as p-fluorophenyl, 3,5-difluorophenyl, pentafluorophenyl, 3,4,5-trifluorophenyl and 3,5-di(trifluoromethyl)phenyl. Preferred options for (VII) are trifluoroborane, tris(4-fluorophenyl)borane, tris (3,5-difluorophenyl)borane, tris(4-fluoromethylphenyl)borane, tris(2,4,6-trifluorophenyl)borane, tris(penta-fluorophenyl)borane, tris(3,5-difluorophenyl)borane and/or tris (3,4, 5-trifluorophenyl)borane.

Particular preference is given to tris(pentafluorophenyl) borane.

However it is preferred that borates are used as a boron containing cocatalyst, i.e. compounds containing a borate.

These compounds generally contain an anion of formula:

$$(Z)_4B^- \qquad (VIII)$$

where Z is an optionally substituted phenyl derivative, said substituent being a halo-C$_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used include: tributylammoniumtetra(pentafluorophenyl)borate, tributylammoniumtetra(trifluoromethylphenyl)borate, tributylammoniumtetra(4-fluorophenyl)borate, N,N-dimethylcyclohexylammoniumtetrakis(pentafluorophenyl)borate, N,N-dimethylbenzylammoniumtetrakis(pentafluorophenyl) borate, N,N-dimethylaniliniumtetrakis(pentafluorophenyl) borate, N,N-di(propyl)ammoniumtetrakis (pentafluorophenyl)borate, di(cyclohexyl) ammoniumtetrakist(pentafluorophenyl)borate, triphenylcarbeniumtetrakis(pentafluorophenyl)borate, or ferroceniumtetrakis(pentafluorophenyl)borate.

Preference is given to triphenylcarbeniumtetrakis(pentafluorophenyl) borate, N,N-dimethylaniliniumtetrakis(pentafluorophenyl)borate, N,N-dimethylcyclohexylammoniumtetrakis(pentafluorophenyl)borate, or N,N-dimethylbenzylammoniumtetrakis(pentafluorophenyl) borate.

It is especially preferred to use an aluminoxane cocatalyst, for example MAO, together with a boron containing cocatalyst, for example a borate cocatalyst.

Suitable amounts of co-catalyst will be well known to the skilled person. Preferably, the amount of cocatalyst is chosen to reach the below defined molar ratios.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol. Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

The random propylene-ethylene copolymer is preferably the only polymer present in layer B. It preferably forms at least 90 wt. %, more preferably at least 95 wt. %, yet more preferably at least 98 wt. %, of the total weight of layer B. Any balance up to 100 wt. % can be made up with conventional additives as discussed above.

Layer B preferably has a thickness of 8 to 490 μm, more preferably 10 to 390 μm and still more preferably 12 to 290 μm. Layer B is thicker than layer A and thicker than layer C. Preferably, layer B is as thick or thicker than layers A and C together, that is to say layer B contributes at least 50% of the total thickness of the layers A, B and C.

Layer B is preferably attached, i.e. joined, directly to both layers A and C of the multilayer film.

Layer C

Layer C either (option 1) comprises 80 to 99 wt. % of a single site catalysed (SSC) linear low density polyethylene (LLDPE) having a melt flow rate MFR (measured according to ISO 1133 at 190° C. and 2.16 kg load) of 0.5 to 8.0 g/10 min and a density of 890 to 925 kg/m$^3$, and 1 to 20 wt. % of a high-pressure low density polyethylene (LDPE) having a melt flow rate MFR (measured according to ISO 1133 at 190° C. and 2.16 kg load) of 0.05 to 2.0 g/10 min and a density of 910 to 940 kg/m$^3$; or (option 2) layer C comprises a polypropylene homopolymer having a melt flow rate MFR (measured according to ISO 1133 at 230° C. and 2.16 kg load) of 0.3 to 30 g/10 min and a melting point Tm (measured by DSC according to ISO 11357-3) in the range of 160 to 170° C.

Layer C preferably has a thickness of 2 to 50 μm, more preferably 3 to 40 μm and most preferably 4 to 30 μm.

In option 1, the above disclosure of preferred features of layer A applies equally and independently to layer C. Hence it is preferred that in option 1, layer C forms one of the outermost layers of the multilayer film, that is it forms one of the two surfaces of the multilayer film. Layer C is preferably attached, i.e. joined, to layer B of the multilayer film. More preferably, layer C forms one of the outermost layers of the multilayer film and is attached to layer B. Layer C according to option 1 forms a second sealing layer.

In option 1, the composition of layers A and C may be the same or different. In a highly preferred embodiment of option 1, layer C has the same composition as layer A. This is equivalent to the multilayer film comprising at least three layers A-B-A, in that order.

When layer C comprises a polypropylene homopolymer having a melt flow rate MFR (measured according to ISO 1133 at 230° C. and 2.16 kg load) in the range of 0.3 to 30 g/10 min, preferably in the range of 0.5 to 20 g/10 min, like in the range of 1.0 to 12 g/10 min, and a melting point Tm (measured by DSC according to ISO 11357-3) in the range of 160 to 170° C. (option 2), it can act as a heat shield for the multilayer film. The term "heat shield layer" is a term of the art in this technical field, i.e. it is a layer which does not melt during heat sterilization. When layer C acts as a heat shield in the multilayer film, it preferably forms one of the outermost (i.e. surface) layers of the multilayer film and is preferably attached, i.e. joined, directly to layer B of the multilayer film.

In option 2, the polypropylene homopolymer is preferably the only polymer present in layer C. The polypropylene homopolymer preferably forms at least 90 wt. %, more preferably at least 95 wt. %, yet more preferably at least 98 wt. %, of the total weight of layer C. Any balance up to 100 wt. % can be made up with conventional additives as discussed above.

Preferably, the propylene homopolymer has a melt flow rate MFR (230° C., 2.16 kg) in the range of 0.5 to 20.0 g/10 min, more preferably in the range of 1.0 to 12.0 g/10 min.

Suitable polypropylene homopolymers are known in the art and are commercially available, a suitable example being HC101BF commercially available from Borealis AG, Austria, having a MFR (230° C., 2.16 kg) of 3.2 g/10 min and a melting temperature (DSC) of 161° C.

Polyolefin Compositions

In another aspect, the invention provides a polyolefin composition (I) formed by mechanical recycling of the multilayer film of the invention. Polyolefin composition (I) is therefore a recyclate. The polymer components of layers A, B and C are compatible with one another and can form a blended composition when the multilayer film is recycled.

Preferably, said mechanical recycling is performed in a continuous melt-mixing device at a temperature range of 170 to 270° C. Auxiliary process steps such as cutting, washing, separation and filtration may be integral parts of any mechanical recycling process. The recyclate is preferably granulated to form pellets. Suitable mechanical recycling processes are described for example in chapter 2 of the review paper by Ragaert et al., Waste Management 69 (2017) 24-58.

In another aspect, the invention provides a polyolefin composition (II) comprising:
(i) 50 to 90 wt. % of random propylene-ethylene copolymer with a total ethylene content of 3.0 to 7.5 wt. % having a melt flow rate MFR (measured according to ISO 1133 at 230° C. and 2.16 kg load) of 0.5 to 5.0 g/10 min and a melting point Tm (measured by DSC according to ISO 11357-3) of 110 to 135° C.;
(ii) 4 to 49.9 wt. % of single site catalysed (SSC) LLDPE having a melt flow rate MFR (measured according to ISO 1133 at 190° C. and 2.16 kg load) of 0.5 to 8.0 g/10 min and a density of 890 to 925 kg/m$^3$;
(iii) 0.05 to 10 wt. % of high-pressure LDPE having a melt flow rate MFR (measured according to ISO 1133 at 190° C. and 2.16 kg load) of 0.05 to 2.0 g/10 min and a density of 910 to 940 kg/m$^3$; and
(iv) 0 to 25 wt. % of polypropylene homopolymer having an MFR (measured according to ISO 1133 at 230° C. and 2.16 kg load) of 0.3 to 30 g/10 min and a melting point Tm (measured by DSC according to ISO 11357-3) of 160 to 170° C.

Preferred are polyolefin compositions (II) comprising:
(i) 50 to 84 wt. % of random propylene-ethylene copolymer with a total ethylene content of 3.0 to 7.5 wt. % having an MFR (230° C./2.16 kg) of 0.5 to 5.0 g/10 min and a Tm (DSC) of 110 to 135° C.;
(ii) 6.8 to 45 wt. % of single site catalysed (SSC) LLDPE having an MFR (190° C./2.16 kg) of 0.5 to 8.0 g/10 min and a density of 890 to 925 kg/m$^3$
(iii) 0.1 to 6.6 wt. % of high-pressure LDPE having an MFR (190° C./2.16 kg) of 0.05 to 2.0 g/10 min and a density of 910-940 kg/m$^3$; and
(iv) 0 to 22 wt. % of polypropylene homopolymer having an MFR (230° C./2.16 kg) of 0.3 to 30 g/10 min and a Tm (DSC) of 160 to 170° C.

More preferred are polyolefin compositions (II) comprising:
  (i) 50 to 80 wt. % of random propylene-ethylene copolymer with a total ethylene content of 3.0 to 7.5 wt. % having an MFR (230° C./2.16 kg) of 0.5 to 5.0 g/10 min and a Tm (DSC) of 110 to 135° C.;
  (ii) 8.8 to 45 wt. % of single site catalysed (SSC) LLDPE having an MFR (190° C./2.16 kg) of 0.5 to 8.0 g/10 min and a density of 890 to 925 kg/m$^3$;
  (iii) 0.2 to 5.0 wt. % of high-pressure LDPE having an MFR (190° C./2.16 kg) of 0.05 to 2.0 g/10 min and a density of 910-940 kg/m$^3$; and
  (iv) 0 to 20 wt. % of polypropylene homopolymer having an MFR (230° C./2.16 kg) of 0.3 to 30 g/10 min and a Tm (DSC) of 160 to 170° C.

Preferably, polyolefin composition (II) is formed by mechanically recycling a multilayer film of the invention. Polyolefin composition (II) is therefore preferably a recyclate.

The preferred features of the SSC LLDPE and LDPE of layer A, the random propylene-ethylene copolymer of layer B and the polypropylene homopolymer of layer C (option (2)) described above apply equally to the corresponding components of the polyolefin compositions (I) and (II).

The MFR (230° C./2.16 kg) of the polyolefin compositions (I) and (II) is preferably 1.0-10.0 g/10 min, more preferably 1.2-8.0 g/10 min and still more preferably 1.4-6.0 g/10 min.

The polyolefin compositions (I) and (II) have at least two melting temperatures Tm due to the polypropylene components and the polyethylene components. The Tm of the polypropylene components is preferably 110-135° C., more preferably 112-130° C. and most preferably 115-125° C., whilst the Tm of the polyethylene components is preferably 60-112° C., more preferably 65-110° C. and most preferably 70-108° C.

The polyolefin compositions (I) and (II) can be blended with a polypropylene random copolymer having a melt flow rate MFR (measured according to ISO 1133 at 230° C. and 2.16 kg load) of 1.0 to 20 g/10 min and a melting point Tm (measured by DSC according to ISO 11357-3) of 135 to less than 160° C. to form a further polyolefin composition. In another aspect, the invention therefore provides a polyolefin composition (III) comprising:
  (a) 5 to 50 wt. % of the polyolefin composition (I) or (II); and
  (b) 50 to 95 wt. % of a polypropylene random copolymer (R-PP) having a melt flow rate MFR (measured according to ISO 1133 at 230° C. and 2.16 kg load) of 1.0 to 20 g/10 min and a melting point Tm (measured by DSC according to ISO 11357-3) of 135 to less than 160° C.

The wt. % values in polyolefin compositions (I), (II) and (III) are based on the total weight of the relevant composition.

The preferred features of the SSC LLDPE and LDPE of layer A, the random propylene-ethylene copolymer of layer B and the polypropylene homopolymer of layer C (option (2)) described above apply equally to the corresponding components of the polyolefin compositions (III).

The amount of component (a) in polyolefin composition (III) is preferably 15 to 45 wt. %, more preferably 20 to 40 wt. %. The amount of polypropylene random copolymer (b) in polyolefin composition (III) is preferably 55 to 85 wt. %, more preferably 60 to 80 wt. %.

The polypropylene random copolymer R-PP used as component (b) in polyolefin composition (III) is preferably a copolymer of propylene with one or more $C_2$ and/or $C_4$-$C_{10}$ α-olefin comonomers. More preferably the random propylene copolymer R-PP is a copolymer of propylene with one or more comonomers selected from ethylene, 1 butene and/or 1-hexene. It is in particular preferred that the random propylene copolymer R-PP is a copolymer of propylene and ethylene.

Preferred are polypropylene copolymers R-PP comprising 12 wt. % or less of said comonomers, for example 1.0 to 7.0 wt. %, more preferably 1.5 to 6.0 wt. %, still more preferably 2.0 to 5.5 wt. %.

The melt flow rate (MFR230/2.16) of the random propylene copolymer R-PP is determined according to ISO1133, and is in the range of 1.0 to 20 g/10 min, preferably 1.5 to 15.0 g/10 min, more preferably in the range of 1.8 to 10.0 g/10 min, such as 2.0 to 9.0 g/10 min.

The melting point Tm of the random propylene copolymer R-PP is measured by DSC (according to ISO 11357-3) and is in the range of 135 to less than 160° C., preferably 140 to 150° C.

The random propylene copolymer R-PP can be unimodal or multimodal, for example bimodal in view of the molecular weight distribution and/or the comonomer content distribution; both unimodal and bimodal polypropylenes are equally preferred.

The random propylene copolymer can be produced by polymerization in the presence of any conventional coordination catalyst system including Ziegler-Natta, chromium and single site (for example metallocene) catalyst systems, preferably in the presence of a Ziegler-Natta catalyst system.

The random propylene copolymer R-PP may be any such copolymer that is known in the art as being suitable for use in forming films. Suitable random propylene copolymers are commercially available from Borealis, and include for example Bormed™ RB801CF having an MFR (230° C./2.16 kg) of 1.9 g/10 min and a melting temperature (DSC) of 140° C.

Polyolefin composition (III) can be produced by any suitable melt mixing process at temperatures above the melting point of the composition. Typical devices for performing said melt mixing process are twin screw extruders, single screw extruders optionally combined with static mixers, chamber kneaders like Farrel kneaders, Banbury type mixers and reciprocating co-kneaders like Buss co-kneaders. Preferably, the melt mixing process is carried out in a twin screw extruder with high intensity mixing segments and preferably at a temperature of 170 to 270° C., more preferably of 180 to 250° C.

It is also possible to produce polyolefin composition (III) by dry-blending in a suitable mixing equipment, for example horizontal and vertical agitated chambers, tumbling vessels, and Turbula mixers, as long as sufficient homogeneity is obtained.

Uses of the Compositions

The polyolefin compositions (i), (II) and (III) can be used in forming films which have properties which makes then suitable for packaging applications. Films suitable for packaging applications typically have good optical properties such as gloss and transparency, plus surface smoothness, planarity and good tear resistance.

In another aspect, the invention therefore provides films formed using the polyolefin compositions (I), (II) or (III), preferably from polyolefin composition (III). Such films may be formed using techniques known in the art. The films may be for example cast or blown films, and are preferably blown films.

For film formation using the polyolefin compositions (I), (II) or (III) it is important that the different polymer components be intimately mixed prior to casting/blowing of the film as otherwise there is a risk of inhomogeneities, e.g. gels, appearing in the film. Sufficient homogeneity can also be obtained by selecting the screw design for the film extruder such that it is designed for good mixing and homogenising.

Following their production, the films may be subjected to a surface energy increasing treatment, such as for example chemical treatment, flame-treatment, plasma-treatment or Corona-treatment. The preferred methods are Plasma- and Corona-treatment. The most preferred method is Corona-treatment Films formed from polyolefin compositions (I), (II) or (III) can be used for lamination or in mono- or multilayer films, general packaging films, like bread bags, pouches and medical/hygienic films.

EXPERIMENTAL

Measuring Methods

The following definitions of terms and determination methods apply to the above general description of the invention as well as to the below examples unless otherwise defined.

Melt Flow Rate (MFR)

The melt flow rates of polypropylenes are measured at 230° C. with a load of 2.16 kg ($MFR_{230/2.16}$) according to ISO 1133.

The melt flow rates of polyethylenes are measured at 190° C. with a load of 2.16 kg ($MFR_{190/2.16}$) according to ISO 1133.

DSC Analysis, Melting Temperature (Tm), Melting Enthalpy (Hm) and Crystallization Temperature (Tc)

Tm and Tc were measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) and crystallization enthalpy (Hc) are determined from the cooling step, while melting temperature (Tm) and melting enthalpy (Hm) are determined from the second heating step.

Tensile Modulus (TM) and Elongation at Break

Tensile modulus in both the machine (MD) and transverse (TD) directions was determined according to ISO 527-3 at 23° C. on cast films of 50 m thickness produced on a monolayer cast film line with a melt temperature of 220° C. and a chill roll temperature of 20° C. with a thickness of 50 m produced as indicated below. Testing was performed at a cross head speed of 1 mm/min up to the yield limit, and at 10 mm/min up to specimen breakage.

Transparency, Haze and Clarity

Transparency, haze and clarity were determined according to ASTM D1003-00 on cast films with a thickness of 50 μm produced as indicated below.

Dart-Drop Impact Strength (DDI)

DDI was measured using ASTM D1709, method A (Alternative Testing Technique) from the film samples. A dart with a 38 mm diameter hemispherical head was dropped from a height of 0.66 m onto a film clamped over a hole. Successive sets of twenty specimens were tested. One weight was used for each set and the weight was increased (or decreased) from set to set by uniform increments. The weight resulting in failure of 50% of the specimens was calculated and reported.

Tear Resistance

Tear resistance (determined as Elmendorf tear (N)) was measured in the same way in machine direction (MD) and transverse direction (TD). The tear strength was measured using the ISO 6383/2 method. The force required to propagate tearing across a film sample was measured using a pendulum device. The pendulum swings under gravity through an arc, tearing the specimen from a pre-cut slit. The film sample was fixed on one side by the pendulum and on the other side by a stationary clamp. The tear resistance is the force required to tear the specimen. The relative tear resistance (N/mm) is calculated by dividing the tear resistance by the thickness of the film.

Xylene Cold Solubles (XCS)

The content of xylene cold solubles (XCS) in wt. % is determined at 25° C. according to ISO 16152; 2005.

Hexane Hot Solubles FDA Section 177.1520

The hexane hot solubles are determined according to FDA section 177.1520.1 g of a polymer blown film of 100 m thickness is added to 400 ml hexane at 50° C. for 2 hours while stirring with a reflux cooler. After 2 hours the mixture is immediately filtered on a filter paper N° 41. The precipitate is collected in an aluminium recipient and the residual hexane is evaporated on a steam bath under $N_2$ flow. The amount of hexane solubles is determined by the formula ((wt·sample+wt·crucible)−(wt·crucible))/(wt·sample)× 100.

All film properties (except xylene and hexane solubles) were determined on monolayer blown films of 50 m thickness produced on a Collin blown film line. This line has a screw diameter of 30 millimeters (mm), L/D of 30, a die diameter of 60 mm, a die gap of 1.5 mm and a duo-lip cooling ring. The film samples were produced at 190° C. with an average thickness of 50 m, with a 2.5 blow-up ratio and an output rate of about 8 kilograms per hour (kg/h).

EXAMPLES

The following materials were used in the Examples:

RB801CF is a ZN random polypropylene copolymer, commercially available from Borealis, with Tm of 140° C. and $MFR_{230/2.16}$ of 1.9 g/10 min.

PPX01 is an SSC ethylene/propylene random copolymer synthesized as described below.

Anteo FK1820 is an SSC (metallocene) LLDPE with $MFR_{190}/2.16$ of 1.5 g/10 min and density of 918 kg/m³, commercially available from Borouge.

FT5230 is an LDPE with $MFR_{190/2.16}$ of 0.75 g/10 min and density of 923 kg/m³, commercially available from Borealis.

Catalyst Synthesis

The copolymer PPX01 was prepared as follows: The metallocene (MC1) (rac-anti-dimethylsilandiyl(2-methyl-4-phenyl-5-methoxy-6-tert-butyl-5 indenyl)(2-methyl-4-(4-tert-butylphenyl)indenyl)zirconium dichloride):

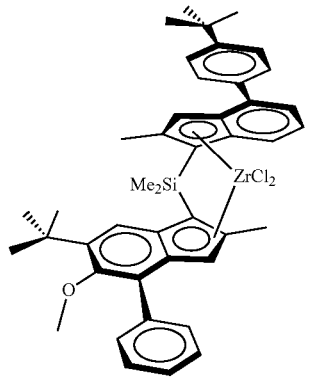

was synthesized according to the procedure as described in WO2013007650, Example 2.

A steel reactor equipped with a mechanical stirrer and a filter net was flushed with nitrogen and the reactor temperature was set to 20° C. Next, silica grade DM-L-303 from AGC Si-Tech Co, pre-calcined at 600° C. (7.4 kg), was added from a feeding drum followed by careful pressuring and depressurising with nitrogen using manual valves. Toluene (32 kg) was then added and the mixture was stirred for 15 min. Next a 30 wt. % solution of MAO in toluene (17.5 kg) from Lanxess was added via feed line on the top of the reactor within 70 min. The reaction mixture was then heated up to 90° C. and stirred at 90° C. for an additional two hours. The slurry was allowed to settle and the mother liquor was filtered off. The MAO treated support was washed twice with toluene (32 kg) at 90° C., following by settling and filtration. The reactor was cooled off to 60° C. and the solid was washed with heptane (32.2 kg). Finally, the MAO treated $SiO_2$ was dried at 60° under nitrogen flow for 2 hours and then for 5 hours under vacuum (−0.5 barg (−0.05 MPag)) with stirring. MAO treated support was collected as a free-flowing white powder found to contain 12.6% Al by weight.

30 wt. % MAO in toluene (2.2 kg) was added into a steel nitrogen blanket reactor via a burette at 20° C. Toluene (7 kg) was then added under stirring. Metallocene MC1 (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under $N_2$ flow at 60° C. for 2h and additionally for 5 h under vacuum (−0.5 barg (−0.05 MPag)) under stirring. Dried catalyst was sampled in the form of pink free flowing powder containing 13.9 wt. % Al and 0.26 wt. % Zr.

Synthesis of Copolymer PPX01

The polymerization to form the copolymer PPX01 was performed in a Borstar pilot plant with a 2-reactor set-up (loop-gas phase reactor (GPR 1)). The polymerization conditions are shown in Table 1. The resulting polymer powder was compounded in a co-rotating twin-screw extruder Coperion ZSK 57 at 220° C. with 0.2 wt. % antiblock agent (synthetic silica; CAS No. 7631-86-9); 0.1 wt. % antioxidant (Irgafos 168FF); 0.1 wt. % of a sterically hindered phenol (Irganox 1010FF); 0.02 wt. % of Ca-stearate) and 0.02 wt. % of a non-lubricating stearate (Synthetic hydrotalcite; CAS No. 11097-59-9).

TABLE 1

| Polymerization conditions | |
| --- | --- |
|  | PPX01 |
| Prepolymerization reactor | |
| Temperature [° C.] | 25 |
| Pressure [Pa] | 5163 |
| Residence time [h] | 0.4 |
| loop reactor | |
| Temperature [° C.] | 68 |
| Pressure [Pa] | 5391 |
| Feed H2/C3 ratio [mol/kmol] | 0.29 |
| Feed C2/C3 ratio [mol/kmol] | 48.3 |
| Polymer Split [wt. %] | 67 |
| MFR2 [g/10 min] (MFR of B-1) | 1.7 |
| Total C2 loop [wt. %] (C2 of B-1) | 4.0 |
| Residence time | 0.4 |
| GPR1 | |
| Temperature [° C.] | 75 |
| Pressure [Pa] | 2500 |
| H2/C3 ratio [mol/kmol] | 2.8 |
| C2/C3 ratio [mol/kmol] | 222 |
| Polymer residence time (h) | 1.8 |
| Polymer Split [wt. %] | 33 |
| Total MFR2 [g/10 min] | 1.2 |
| MFR2 [g/10 min] in GPR1 (MFR of B-2) | 0.6 |
| Total C2 [wt. %] (loop + GPR1) | 4.7 |
| C2 in GPR1 [wt. %] (C2 of B-2) | 6.1 |

TABLE 1-continued

| Polymerization conditions | |
| --- | --- |
|  | PPX01 |
| XCS [wt. %] | 2.4 |
| Total productivity (kg PP/g cat) | 22 |

Inventive Example 1 (IE1) and Comparative Example 1 (CE1)

Three layer films were produced on a Collin 3 layer film line. The film structure was A-B-A and the total film thickness was 50 μm, with each layer A having a thickness of 12.5 μm and layer B a thickness of 25 μm.

In IE1, each layer A was 90 wt. % FK1820 and 10 wt. % FT5230, and layer B was PPX01.

In CE1 each layer A was 90 wt. % FK1820 and 10 wt. % FT5230, and layer B was RB801CF.

The properties of the 3 layer films of IE1 and CE1 were comparable both in terms of mechanics and optics.

The films were recycled to form pellets, the properties of which are shown in Table 2.

TABLE 2

| Properties of IE1 and CEI pellets | | | |
| --- | --- | --- | --- |
| Property | Units | IE1 | CEI |
| MFR (230° C./2.16 kg) | g/10 min | 1.6 | 2.5 |
| Tc1 | ° C. | 108 | 108 |
| Tc2 | ° C. | 85 | 101 |
| Tm1 | ° C. | 121 | 141 |
| Tm2 | ° C. | 106 | 121 |
| Hm1 | J/g | 77 | 35 |
| Hm2 | J/g | 1.2 | 55 |

Inventive Example 2 (IE2) and Comparative Examples 2 and 3 (CE2 and CE3)

The regranulated pellets from IE1 and CE1 were blended with a ZN random polypropylene copolymer (RB801CF) on a Collin BF line and new 50 μm monolayer blown films produced (IE2 and CE3). The properties of the resulting films were compared with a film produced from 100 wt. % RB801CF (CE2). The composition and properties of the monolayer films are shown in Table 3.

TABLE 3

| Properties of IE1, CE2 and CE3 monolayer films | | | | |
| --- | --- | --- | --- | --- |
|  |  | CE2 | IE2 | CE3 |
| RB801CF (wt. %) |  | 100 | 75 | 75 |
| Pellets from IE1 (wt. %) |  |  | 25 |  |
| Pellets from CE1 (wt. %) |  |  |  | 25 |
| 50 μm film |  |  |  |  |
| TM/MD | MPa | 738 | 733 | 771 |
| Elongation @break MD | % | 470 | 628 | 615 |
| TM/TD | MPa | 709 | 733 | 754 |
| Elongation @break TD | % | 392 | 730 | 704 |
| Haze | % | 18 | 4.94 | 10.1 |
| Clarity | % | 89 | 96.6 | 93.2 |
| Tear strength/MD | N/mm | 5.73 | 5.3 | 4.83 |
| Tear strength/TD | N/mm | 12.85 | 11.31 | 10.76 |
| DDI | g | 55 | 56 | 63 |

As can be seen from Table 2, the films formed from the compositions containing the pellets from the recycled films of IE1 and CE1 both had superior optical properties to the film of CE2 made from 100 wt. % ZN random polypropylene copolymer. This is surprising since the more components used in a monolayer film, the higher the haze value of the film tends to be. The film of IE2 formed from the recycled films of IE1 had the best optical properties while the mechanical properties are still maintained at a good level.

The invention claimed is:

1. A mechanically recyclable multilayer film comprising at least three layers A-B-C, in that order, wherein:
    layer A comprises;
        80 to 99 wt. % of a single site catalysed (SSC) LLDPE having a melt flow rate MFR (measured according to ISO 1133 at 190° C. and 2.16 kg load) of 0.5 to 8.0 g/10 min and a density of 890 to 925 kg/m$^3$, and
        1 to 20 wt. % of a high-pressure LDPE having a melt flow rate MFR (measured according to ISO 1133 at 190° C. and 2.16 kg load) of 0.05 to 2.0 g/10 min and a density of 910-940 kg/m$^3$;
    layer B comprises:
        a random propylene-ethylene copolymer with a total ethylene content of 3.0 to 7.5 wt. % having a melt flow rate MFR (measured according to ISO 1133 at 230° C. and 2.16 kg load) of 0.5 to 5.0 g/10 min and a melting point Tm (measured by DSC according to ISO 11357-3) of 110 to 135° C.; and
    layer C comprises:
        80 to 99 wt. % of a single site catalysed (SSC) LLDPE having a melt flow rate MFR (measured according to ISO 1133 at 190° C. and 2.16 kg load) of 0.5 to 8.0 g/10 min and a density of 890 to 925 kg/m$^3$, and
        1 to 20 wt. % of a high-pressure LDPE having a melt flow rate MFR (measured according to ISO 1133 at 190° C. and 2.16 kg load) of 0.05 to 2.0 g/10 min and a density of 910-940 kg/m$^3$;
    or
    layer C comprises:
        a polypropylene homopolymer having a melt flow rate MFR (measured according to ISO 1133 at 230° C. and 2.16 kg load) of 0.3 to 30 g/10 min and a melting point Tm (measured by DSC according to ISO 11357-3) of 160 to 170° C.;
    and wherein layer A and layer C are both thinner than layer B.

2. The mechanically recyclable multilayer film of according to claim 1, wherein layer C comprises:
    80 to 99 wt. % of a single site catalysed (SSC) LLDPE having a melt flow rate MFR (measured according to ISO 1133 at 190° C. and 2.16 kg load) of 0.5 to 8.0 g/10 min and a density of 890 to 925 kg/m$^3$, and
    1 to 20 wt. % of a high-pressure LDPE having a melt flow rate MFR (measured according to ISO 1133 at 190° C. and 2.16 kg load) of 0.05 to 2.0 g/10 min and a density of 910-940 kg/m$^3$.

3. The mechanically recyclable multilayer film of claim 1, wherein layer C comprises a polypropylene homopolymer having a melt flow rate MFR (measured according to ISO 1133 at 230° C. and 2.16 kg load) of 0.3 to 30 g/10 min and a melting point Tm (measured by DSC according to ISO 11357-3) of 160 to 170° C.

4. The mechanically recyclable multilayer film of claim 1, wherein layers A, B and C together have a thickness of from 10 to 500 μm.

5. The mechanically recyclable multilayer film of claim 1, wherein layer A and layer C each independently have a thickness of from 2 to 50 μm.

6. The mechanically recyclable multilayer film of claim 1, wherein layer B has a thickness of from 8 to 490 μm.

7. The mechanically recyclable multilayer film of claim 1, wherein the random propylene-ethylene copolymer in layer B consists of:
    50.0 to 85.0 wt. % of a polymer fraction (B-1) having:
        (i) an ethylene content in the range of from 2.0 to less than 5.5 wt. %, and
        (ii) a melt flow rate $MFR_{B-1}$ (measured according to ISO 1133 at 230° C. and 2.16 kg load) in the range of from 0.5 to 5.0 g/10 min; and
    15.0 to 50.0 wt. % of a polymer fraction (B-2) having:
        (i) an ethylene content in the range of from 5.5 to 10.0 wt. %, and
        (ii) a melt flow rate $MFR_{B-2}$ (measured according to ISO 1133 at 230° C. and 2.16 kg load) in the range of 10 from 0.1 to 3.0 g/10 min;
    wherein the melt flow rate $MFR_{B-2}$ of polymer fraction (B-2) is lower than the $MFR_{B-1}$ of polymer fraction (B-1).

8. The mechanically recyclable multilayer film of claim 1, wherein layer A comprises from 85 to 98 wt. % of the single site catalysed (SSC) LLDPE.

9. The mechanically recyclable multilayer film of claim 1, wherein layer A comprises from 2 to 15 wt. % of the high-pressure LDPE.

10. The mechanically recyclable multilayer film of claim 1, wherein the single site catalysed (SSC) LLDPE in layer A has:
    a density of 900 to 925 kg/m$^3$; and/or
    a melt flow rate MFR (measured according to ISO 1133 at 190° C. and 2.16 kg load) of 0.8 to 4.0 g/10 min.

11. The mechanically recyclable multilayer film of claim 1, wherein the high-pressure LDPE in layer A has:
    a density of 915 to 935 kg/m$^3$; and/or
    a melt flow rate MFR (measured according to ISO1133 at 190° C. and 2.16 kg load) of 0.10 to 1.5 g/10 min.

12. The mechanically recyclable multilayer film of claim 1, wherein the single site catalysed (SSC) LLDPE in layer A is a copolymer of ethylene and at least one $C_3$ to $C_{10}$ α-olefin comonomer.

13. The mechanically recyclable multilayer film of claim 1, wherein the amount of α-olefin comonomer(s) in the single site catalysed (SSC) LLDPE is from 1.0 to 10 mol. %.

14. The mechanically recyclable multilayer film of claim 1, which is a blown film or a cast film.

15. A polyolefin composition formed by mechanical recycling of the mechanically recyclable multilayer film of claim 1.

16. A polyolefin composition comprising:
    50 to 90 wt. % of random propylene-ethylene copolymer with a total ethylene content of 3.0 to 7.5 wt. % having a melt flow rate MFR (measured according to ISO 1133 at 230° C. and 2.16 kg load) of 0.5 to 5.0 g/10 min and a melting point Tm (measured by DSC according to ISO 11357-3) of 110 to 135° C.;
    4 to 49.9 wt. % of single site catalysed (SSC) LLDPE having a melt flow rate MFR (measured according to ISO 1133 at 190° C. and 2.16 kg load) of 0.5 to 8.0 g/10 min and a density of 890 to 925 kg/m$^3$;
    0.05 to 10 wt. % of high-pressure LDPE having a melt flow rate MFR (measured according to ISO 1133 at 190° C. and 2.16 kg load) of 0.05 to 2.0 g/10 min and a density of 910 to 940 kg/m$^3$; and
    0 to 25 wt. % of polypropylene homopolymer having an MFR (measured according to ISO 1133 at 230° C. and 2.16 kg load) of 0.3 to 30 g/10 min and a melting point Tm (measured by DSC according to ISO 11357-3) of 160 to 170° C.

17. The polyolefin composition according to claim 15, wherein the polyolefin composition comprises:
    50 to 90 wt. % of random propylene-ethylene copolymer with a total ethylene content of 3.0 to 7.5 wt. % having a melt flow rate MFR (measured according to ISO 1133 at 230° C. and 2.16 kg load) of 0.5 to 5.0 g/10 min and a melting point Tm (measured by DSC according to ISO 11357-3) of 110 to 135° C.;

4 to 49.9 wt. % of single site catalysed (SSC) LLDPE having a melt flow rate MFR (measured according to ISO 1133 at 190° C. and 2.16 kg load) of 0.5 to 8.0 g/10 min and a density of 890 to 925 kg/m$^3$;

0.05 to 10 wt. % of high-pressure LDPE having a melt flow rate MFR (measured according to ISO 1133 at 190° C. and 2.16 kg load) of 0.05 to 2.0 g/10 min and a density of 910 to 940 kg/m$^3$; and 0 to 25 wt. % of polypropylene homopolymer having an MFR (measured according to ISO 1133 at 230° C. and 2.16 kg load) of 0.3 to 30 g/10 min and a melting point Tm (measured by DSC according to ISO 11357-3) of 160 to 170° C.

18. A polyolefin composition comprising:
(a) 5 to 50 wt. % of the polyolefin composition of claim 15; and
(b) 50 to 95 wt. % of a polypropylene random copolymer having a melt flow rate MFR (measured according to ISO 1133 at 230° C. and 2.16 kg load) of 1.0 to 20 g/10 min and a melting point Tm (measured by DSC according to ISO 11357-3) of 135 to less than 160° C.

19. A method of use of the polyolefin composition of claim 15, the method comprising using the polyolefin composition to prepare a film.

20. A film formed from the polyolefin composition of claim 15.

* * * * *